United States Patent [19]

Beaudet

[11] 3,758,520

[45] Sept. 11, 1973

[54] PROCESS FOR THE PREPARATION OF BETA-NAPHTHOQUINONE SEMICARBAZONE

[76] Inventor: Camille Alphonse Beaudet, Avenue A. Lancaster, 86 Uccle, Belgium

[22] Filed: July 23, 1971

[21] Appl. No.: 165,399

[52] U.S. Cl. ............................................ 260/396 N
[51] Int. Cl. ........................................... C07c 133/08
[58] Field of Search ................................. 260/396 N

[56] References Cited
UNITED STATES PATENTS
3,256,331    6/1966    Jones et al. ...................... 260/396 N OTHER PUBLICATIONS
Merck Index, 1968, p. 717

Primary Examiner—Vivian Garner
Attorney—Irvin S. Thompson and Robert J. Patch

[57] ABSTRACT

A process for the preparation of β-naphthoquinone semicarbazone, which comprises reacting an aqueous solution of semicarbazide hydrochloride with a boiling ethanolic solution of β-naphthoquinone and taking care that the relative amounts of water and ethanol in the reaction mixture be in a volume ratio of from 40:100 to 360:100.

In this way, the β-naphthoquinone semicarbazone is obtained with great purity and high yield.

4 Claims, No Drawings

PROCESS FOR THE PREPARATION OF BETA-NAPHTHOQUINONE SEMICARBAZONE

BACKGROUND OF THE INVENTION

This invention relates to improvements to the preparation of β-naphthoquinone semicarbazone which is a known compound having hemostatic properties.

It is known to prepare β-naphthoquinone semicarbazone by a process in which β-naphthoquinone is dissolved in 96% ethanol at a temperature of about 50°C, semicarbazide hydrochloride is then added to the obtained solution of β-naphthoquinone, the amount of added semicarbazide hydrochloride being less than equimolar in respect of the amount of β-naphthoquinone, the obtained mixture is thereafter stirred during 45 minutes at 50°C and then cooled at 3°C. β-naphthoquinone semicarbazone melting at 182–184°C is finally recovered by filtration. Yield: 59%.

SUMMARY OF THE INVENTION

It has now been found that it is possible to obtain β-naphthoquinone semicarbazone with a substantially higher yield and a much better purity when the reaction conditions of the known process are modified as described hereafter.

It has been discovered that these improved results may be surprisingly obtained when an aqueous solution of the semicarbazide hydrochloride is added to a boiling ethanolic solution of β-naphthoquinone.

In respect of the yield of β-naphthoquinone semicarbazone, a maximum of about 80% is obtained when the volume ratio of water:ethanol is between about 40:100 and about 360:100.

DETAILED DESCRIPTION OF THE INVENTION

In other words, β-naphthoquinone semicarbazone is obtained with a yield of about 80% when an aqueous solution of semicarbazide hydrochloride is added to a boiling ethanolic solution of β-naphthoquinone, the amount of water present in the reaction mixture being between about 40 and 360 parts by volume for 100 parts by volume of pure ethanol.

In respect of the purity of the β-naphthoquinone semicarbazone, it has been found that a maximum of 100% is obtained when the volume ratio of water:ethanol is of about 40:100. This means that 100% pure β-naphthoquinone semicarbazone is obtained when an aqueous solution of semicarbazide hydrochloride is reacted with an ethanolic solution of β-naphthoquinone the amount of water present in the reaction mixture being of about 40 parts by volume for 100 parts by volume of pure ethanol.

It has also been found that it is advantageous to use an excess of semicarbazide hydrochloride with regard to the molar amount of β-naphthoquinone, this excess being of at least 1% by weight and preferably of 1 to 5%.

This invention relates therefore to a process for preparing β-naphthoquinone semicarbazone, by reacting semicarbazide hydrochloride with β-naphthoquinone, said process being characterized by the fact that an aqueous solution of semicarbazide hydrochloride is reacted with a boiling ethanolic solution of β-naphthoquinone, the amounts of water and ethanol present in the reaction mixture being such that the volume ratio of water:ethanol is between about 40:100 and 360:100, said ratio being preferably of about 40:100.

The aqueous solution of semicarbazide hydrochloride is preferably slowly added to the boiling ethanolic solution of β-naphthoquinone and the reaction mixture is allowed to cool to the room temperature while being stirred. The reaction mixture is then kept at a temperature of about 4°C in a refrigerator during several hours, whereafter water is added thereto, the obtained precipitate being finally filtered, washed with water and dried.

The new process is described in detail in the following illustrative examples.

EXAMPLE 1

0.5 g (0.00318 mole) of β-naphthoquinone are dissolved in 10 ml of boiling 96% ethanol. An aqueous solution of 0.368 g (0.0032 mole) of semicarbazide hydrochloride in 18 ml of water at a temperature of about 60°C is then slowly added to the β-naphthoquinone ethanolic solution. The volume ratio of water:ethanol in the reaction mixture is of about 180/100. When the addition of the aqueous solution of semicarbazide hydrochloride has been completed, the reaction mixture is allowed to cool, while being stirred. The reaction mixture is then kept in a refrigerator at about 4°C during several hours (8 to 10 hours). 28 ml of water are then added to the reaction mixture which is then filtered so as to separate the precipitate of β-naphthoquinone semicarbazone. This precipitate is finally filtered, washed with water and dried. 0.55 g of β-naphthoquinone semicarbazone having a purity of 94.5% and melting at 185°C are obtained. Yield: 81%.

EXAMPLES 2 to 6

The method described in example 1 is used except that various amounts of water and ethanol are used.

The following table gives the purity and the yield of β-naphthoquinone semicarbazone, as well as the approximate volume ratio of water:ethanol in the reaction mixture. The results obtained in example 1 are also mentioned in the following table.

TABLE

| Example No. | Amount of ethanol used (ml) | Amount of water used (ml) | Volume ratio water:ethanol | β-naphthoquinone semicarbazone Yield % | β-naphthoquinone semicarbazone Purity % |
|---|---|---|---|---|---|
| 2 | 24 | 4 | 16:100 | 70 | 100 |
| 3 | 20 | 8 | 40:100 | 80 | 100 |
| 4 | 14 | 14 | 100:100 | 81 | 97 |
| 1 | 10 | 18 | 180:100 | 81 | 94.5 |
| 5 | 6 | 22 | 360:100 | 83 | 86.8 |
| 6 | 4 | 24 | 600:100 | 1 | |

In examples 1 to 6, the purity of the obtained β-naphthoquinone semicarbazone has been determined by measuring the optical density in the presence of ammonia at 490 nm (in respect of a reference sample).

The precipitate obtained in example 6 comprises essentially non-reacted β-napththoquinone.

In respect of both the yield and purity of the obtained β-naphthoquinone semicarbazone, the above table shows clearly that the optimum operating conditions are those where the reaction mixture contains water and alcohol in a volume ratio of about 40:100.

I claim:

1. A process for preparing β-naphthoquinone semicarbazone by reacting semicarbazide hydrochloride with β-naphthoquinone, characterized by the fact that an aqueous solution of semicarbazide hydrochloride is reacted with a boiling ethanolic solution of β-napththoquinone, the amounts of water and ethanol present in the reaction mixture being such that the volume ratio of water:ethanol is between about 40:100 and 360:100.

2. A process according to claim 1, characterized by the fact that the water:ethanol volume ratio is of about 40:100.

3. A process according to claim 1, characterized by the fact that an excess of at least 1% by weight of semicarbazide hydrochloride with regard to the amount of β-naphthoquinone is used.

4. A process according to claim 3, characterized by the fact that said excess is of 1% to 5% by weight.

* * * * *